United States Patent [19]

Treadwell

[11] 4,200,699

[45] Apr. 29, 1980

[54] CATALYST COMPOSITION FOR RIGID POLYURETHANE FOAMS

[75] Inventor: Kenneth Treadwell, Rahway, N.J.

[73] Assignee: M&T Chemicals Inc., Woodbridge, N.J.

[21] Appl. No.: 950,816

[22] Filed: Oct. 12, 1978

[51] Int. Cl.$^2$ ............................................. C08G 18/14
[52] U.S. Cl. .................. 521/124; 252/431 C; 521/125
[58] Field of Search .............................. 521/124, 125; 252/431 C

[56] References Cited

U.S. PATENT DOCUMENTS

| 3,245,958 | 4/1966 | Hindersinn et al. ................. 521/124 |
| 3,714,077 | 1/1973 | Cobbledick et al. ................. 521/124 |
| 3,741,918 | 6/1973 | Koleske et al. ....................... 521/124 |
| 3,821,130 | 6/1974 | Barron et al. ........................ 521/124 |

Primary Examiner—Maurice J. Welsh
Attorney, Agent, or Firm—Kenneth G. Wheeless; Robert Spector

[57] ABSTRACT

The rate of the reaction between a polyol and a polyfunctional isocyanate to form a rigid polyurethane foam can be controlled within a wide range, using as the catalyst for said reaction a mixture comprising catalytically effective amounts of an antimony carboxylate, a potassium carboxylate and a zinc carboxylate. The mixture can be used alone or in combination with tertiary amines or tin compounds, both of which are conventionally employed as catalysts for the polyol-isocyanate reaction.

14 Claims, No Drawings

CATALYST COMPOSITION FOR RIGID POLYURETHANE FOAMS

BACKGROUND OF THE INVENTION

This invention relates to the preparation of rigid cellular polyurethanes. This invention further relates to novel gel catalyst compositions for preparing rigid cellular polyurethanes. Using these catalyst compositions the rate of the isocyanate-polyol reaction can be controlled within a wide range not heretofore possible using combinations of prior art catalysts.

Rigid polyurethane foams are used as insulating materials for numerous end-use applications, including insulation for structures and containers. For some of these applications, such as spraying, it may be desirable that foam formation and solidification take place as rapidly as possible once the polyfunctional isocyanate and the polyol are combined. For other applications, wherein the formulation must fill large cavities or complex molds, it would be desirable to delay initiation of the isocyanate-polyol reaction until the mixture of reagents has completely filled the cavity or mold. Once this has occurred, foaming and solidification should occur as rapidly as possible to minimize residence time in a mold. Using conventional gel catalysts for rigid polyurethane foams, which include tertiary amines used either alone or in combination with organotin compounds, it is not feasible to control the rate of the isocyanate-polyol reaction over the range required for the various applications of rigid polyurethane foams. The reaction when catalyzed by amine is relatively slow, and the rise time (the time required for the foam to reach its final height) may be as long as 3 or 4 minutes. The rise time is decreased by several orders of magnitude if the amine is used in combination with an organotin compound such as dibutyltin dilaurate. This combination of an amine with an organotin compound is synergistic with the result that the reaction mixture may solidify too rapidly for certain applications, even when the concentration of the organotin compound is reduced to the lowest practical level.

It is an objective of this invention to define a catalyst composition for rigid cellular polyurethanes that will enable the rate of the isocyanate-polyol reaction and the time required to initiate this reaction to be varied within wide ranges. This objective can be achieved using a gel catalyst composition containing an antimony carboxylate, a potassium carboxylate and a zinc carboxylate. This composition can be used along or in combination with the amines and organotin compounds conventionally employed as catalysts for rigid cellular polyurethanes.

SUMMARY OF THE INVENTION

This invention provides a gel catalyst composition for preparing rigid polyurethane foams, said catalyst composition consisting essentially of an antimony carboxylate, a potassium carboxylate and a zinc carboxylate, wherein the hydrocarbyl portion of said carboxylates contain from 1 to 20 carbon atoms and wherein each of said antimony and potassium carboxylates constitutes from 10 to 40% by weight of said composition and the zinc carboxylate constitutes the remaining 20 to 80% by weight.

DETAILED DESCRIPTION OF THE INVENTION

The present gel catalysts are useful for preparing rigid polyurethane foams from substantially all of the known polyols and polyfunctional isocyanates conventionally employed for this purpose. The catalysts are mixtures of antimony, potassium and zinc salts of carboxylic acids containing between 2 and 20 carbon atoms and are employed at a concentration of between 0.05 and 10%, based on the weight of polyol. These salts can be referred to as reaction products of one or more carboxylic acids with basic compounds of antimony, potassium and zinc. Suitable monocarboxylic acids include acetic, propanoic, butanoic, pentanoic, hexanoic, heptanoic and 2-ethylhexanoic acids in addition to other acids containing up to 20 carbon atoms. Unsaturated carboxylic acids derived from oils such as tall oils are animal fats, including oleic acid and linoleic acid, may also be employed. Aromatic carboxylic acids such as benzoic acid, that may exhibit various substituents on the phenyl ring, salicylic acid, and the isomeric naphthenoic acids are also suitable. Polycarboxylic acids such as oxalic, malonic, succinic, glutaric, adipic, pimelic, suberic, azelaic, sebacic, brassylic, thapsic, maleic, fumaric, glutaconic, $\alpha$-hydroxymuconic, $\beta$-hydroxymuconic, $\alpha$-butyl-$\alpha$-ethylglutaric, $\alpha,\beta$-diethylsuccinic, isophthalic, terephthalic, hemimellitic and 1,4-cyclohexane dicarboxylic acids, can be used in place of a monocarboxylic acid. Any of the aforementioned acids can be employed separately or in mixtures containing two or more acids.

Preferably the antimony, potassium, and zinc compounds that constitute the present catalyst compositions are salts of monocarboxylic acids and exhibit the general formulae $Sb(OOCR^1)_3$, $KOOCR^2$ and $Zn(OOCR^3)_2$, respectively, wherein $R^1$, $R^2$ and $R^3$ are hydrocarbyl and contain from 1 to 20 carbon atoms. The term "hydrocarbyl" includes alkyl, cycloalkyl, aryl, alkaryl and aralkyl. Most preferably $R^1$, $R^2$ and $R^3$ are alkyl and contain from 4 to 12 carbon atoms. Acids containing 8 carbon atoms in a linear or branched configuration, including 2-ethylhexanoic acid, are particularly preferred.

The relative amounts of antimony, potassium and zinc carboxylates that are present in the catalyst compositions of this invention will be determined, at least in part, by the rate desired for the isocyanate-polyol reaction. The antimony and potassium salts each constitute from 10 to 40% by weight of the composition, the remaining 20 to 80% being the zinc salt. The composition may also include a solvent for all three salts that is also compatible with the polyol employed to prepare the polyurethane foam. Preferred solvents include oligomers of ethylene oxide and propylene oxide. Liquid polypropylene glycols exhibiting molecular weights of from 300 to about 5,000 constitute a particularly preferred class of solvents.

The carboxylates of potassium, antimony and zinc that constitute the present catalyst compositions can be prepared individually and then combined in the desired proportions. Alternatively, the mixture of carboxylates can be prepared by reacting a stoichiometric amount of the desired carboxylic acid with basic compounds of potassium, antimony and zinc in the appropriate proportions. It is generally convenient to employ a hydroxide or oxide as the basic compound, however, basic salts such as the carbonate or bicarbonate are also suitable. The basic compounds of potassium, antimony and zinc are reacted individually or as a mixture with the desired carboxylic acid or acids. The reaction is preferably conducted in the presence of a water-immiscible, chemically inert liquid medium such as a liquid aliphatic or aromatic hydrocarbon. Since the reaction is usually exothermic, it may be desirable to stir and cool the reaction mixture to avoid localized overheating and resultant product discoloration. The by-product water can be removed during the reaction by azeotropic distillation together with a portion of the liquid hydrocarbon employed as the reaction medium. Alternatively, the water can be removed as an immiscible phase following completion of the reaction.

Polyols conventionally employed to prepare rigid polyurethane foams are liquids which typically exhibit an average molecular weight of between about 500 and 6,000 and include hydroxyl-containing polyethers, polyesters and polyamides and alkylene glycols. These polyols exhibit either primary or secondary active hydroxyl groups. The class of hydroxyl-containing polyethers or polyesters includes fatty acid glycerides having hydroxyl numbers of from 300 to 600 such as castor oil, hydrogenated castor oil and "blown" natural oils.

Hydroxyl-terminated polyethers, a preferred type of polyol, include polyalkylene glycols, e.g., polyethylene glycols and polypropylene glycols. The molecular weight of these compounds is preferably between about 200 and 6,000.

A type of polyether that is particularly preferred for rigid polyurethane foams is obtained by polymerizing propylene oxide in the presence of sucrose or other compounds containing at least three hydroxyl groups. The resultant product exhibits the polyfunctionality required to achieve the crosslinking characteristic of rigid polyurethane foams.

Hydroxyl-terminated polyesters, a second type of polyol, can be obtained by the esterification-condensation reaction of aliphatic dibasic carboxylic acids with glycols, triols or mixtures thereof, in proportions such that most of all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a di- or polyhydroxylated compound such as ethylene glycol, trimethylol propane or pentaerythrotol.

The polyfunctional isocyanates used to prepare rigid polyurethane foams includes both polyisocyanates and polyisothiocyanates. While the invention is described with specific references to the reaction of certain polyfunctional isocyanates it is generically applicable to the reaction of any compound containing more than two —N=C=G radicals wherein G is oxygen or sulfur. Compounds within this generic definition include polyisocyanates and polyisothiocyanates of the formula $R(NCG)_x$ in which the average value of x is greater than 2, preferably from 2.1 to 3.0. R can be alkylene, substituted alkylene, arylene, substituted arylene or other divalent hydrocarbon group that may optionally contain one or more aryl-NCG bonds and one or more alkyl-NCG bonds. Suitable isocyanates include the polyfunctional by-products obtained during the preparation of methylene para-phenyl diisocyanate. Polymethylene polyphenyl isocyanate is an example of such a by-product. Triisocyanates obtained by reacting 3 moles of an arylene diisocyanate for each mole of a triol, e.g., the products formed from 3 moles of tolylene diisocyanate and 1 mole of hexane triol are also useful.

In addition to polyol, polyfunctional isocyanate and one or more of the present catalysts, the reaction mixture contains a blowing agent which boils or decomposes at the temperature of the exothermic polyol-isocyanate reaction to yield as gaseous product which forms bubbles that are entrapped within the reacting polyol-isocyanate mixture as it solidifies. Among the preferred blowing agents are those halogen-containing hydrocarbons boiling from 30° to about 90° C. The precursor also usually contains a surfactant, preferably a siloxane-alkylene oxide copolymer, in an amount of from 1 to about 5 parts by weight per 100 parts of polyol.

As previously disclosed, the present combination of an antimony carboxylate with carboxylates of potassium and zinc are unique in that the catalytic activity of this type of composition can be varied over a wide range by varying either the relative proportions of the three carboxylate salts or the amount of a particular carboxylate salt composition used in combination with conventional gel catalysts for rigid polyurethane foams. These conventional catalysts include tertiary amines such as tricyclohexylamine, triethanolamine, N-ethylmorpholine, triethylene diamine and dimethylethanol amine. The amine is ofted used in combination with inorganic and organic tin compounds. Representative tin-containing catalysts are stannous octoate, stannous oleate, dibutyltin dilaurate, dibutyltin dioctoate, dibutyltin dilauryl mercaptide and dibutyltin-S,S'-bis(isooctyl mercaptoacetate). These conventional gel catalysts are employed at concentrations of from 0 to 5 parts by weight per 100 parts of polyol.

The accompanying example demonstrates the broad range of reaction rates that can be achieved using one of the present catalyst compositions alone and in combination with amines and tin compounds to prepare rigid polyurethane foams. The examples also demonstrate that this broad range cannot be achieved using conventional tin and amine catalysts either individually or in combination. All parts and percentages reported in the examples are by weight unless otherwise specified.

The time interval between combining of all the reagents and the onset of polymerization, as indicated by a transformation of the reaction mixture from clear to opaque, is referred to as "cream time". The interval between combining of all of the reagents and the completion of the ensuing foaming reaction is referred to as "rise time".

To a base formulation containing (1) 30.4 parts of a polyhydroxy-based ethylene oxide-propylene oxide copolymer exhibiting a hydroxyl number of 490 (available as Niax ® polyol LS-490 from the Union Carbide Corporation), (2) 0.45 part of a siloxane-oxyethylene-oxypropylene copolymer available as L-5340 from the Union Carbide Corporation and (3) 9.0 parts of trichlorofluoromethane were added 36.7 parts of polyethylene polyphenyl isocyanate and one or more of the catalysts listed in the following table. The composition referred to as Catalyst A contained 20 parts zinc bis- 2-ethylhexanoate and 15 parts each of antimony tris-2-ethylhexanoate and potassium 2-ethylhexanoate. Fifty parts of a polypropylene glycol (Pluracol P-410 available from BASF-Wyandotte Corporation) was employed as a common solvent for the three salts.

| CATALYST (PARTS) | CREAM TIME (SECONDS) | RISE TIME (SECONDS) |
|---|---|---|
| Dimethylethanolamine (0.75)* | 43 | 237 |
| Dibutyltin Dilaurate (0.1)* | 400 | did not rise completely |
| Catalyst A (1.5) | 85 | 485 |
| Dimethylethanolamine (0.75) Catalyst A (1.5) | 15 | 146 |
| Dibutyltin Dilaurate (0.1) Catalyst A (0.75) | 80 | 261 |
| Dibutyltin Dilaurate (0.3) Catalyst A (0.75) | 63 | 196 |
| Dibutyltin Dilaurate (0.5) Catalyst A (0.75) | 53 | 155 |
| Dibutyltin Dilaurate (0.1)* Dimethylethanol amine (0.75) | 15 | 81 |
| Dibutyltin Dilaurate (0.3)* Dimethylethanol amine (0.75) | 13 | 69 |
| Dibutyltin Dilaurate (0.5) Dimethylethanol amine (0.75) | 12 | 62 |

*= Control

The foregoing data demonstrates that the amine is more active than the Catalyst A composition. The foam prepared using dibutyltin dilaurate did not rise completely and was not of acceptable quality.

The synergism achieved using an amine with the catalyst composition of this invention is demonstrated by the fourth formulation, which exhibited a cream time of 15 seconds and a rise time of 146 seconds. These times are shorter than could be achieved using the amine alone. The formulations containing Catalyst A and dibutyltin dilaurate demonstrate the wide range of cream and rise times that can be achieved using the combination of the present catalyst composition with a conventional organotin cocatalyst that did not produce a satisfactory foam when used alone. This wide range cannot be achieved using combinations of Catalyst A or a tin compound with an amine due to the considerably higher level of catalytic activity exhibited by these combinations, which is comparable to the activity exhibited by conventional combinations of tin compounds and amines.

What is claimed is:

1. A gel catalyst composition for preparing rigid polyurethane foams, said catalyst composition consisting essentially of catalytically effective amounts of an antimony carboxylate, a potassium carboxylate and a zinc carboxylate wherein the hydrocarbyl portions of the carboxylates contain from 1 to 20 carbon atoms and wherein each of said antimony and potassium carboxylates constitutes from 10 to 40% by weight of said composition and the zinc carboxylate constitutes the remaining 20 to 80% by weight.

2. A catalyst composition according to claim 1 wherein said antimony, potassium, and zinc carboxylates exhibit the general formulae $Sb(OOCR^1)_3$, $KOOCR^2$, and $Zn(OOCR^3)_2$, respectively, and wherein $R^1$, $R^2$ and $R^3$ are individually selected from the group consisting of hydrocarbyl containing from 1 to 20 carbon atoms.

3. A gel catalyst composition according to claim 2 wherein $R^1$, $R^2$ and $R^3$ are alkyl.

4. A gel catalyst composition according to claim 3 wherein $R^1$, $R^2$ and $R^3$ are

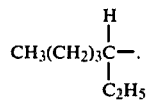

5. A gel catalyst composition according to claim 1 wherein said composition contains a solvent for said antimony, potassium and zinc carboxylates, said solvent being miscible with the polyols employed to prepare said rigid polyurethane foams.

6. A gel catalyst composition according to claim 5 wherein said solvent is a liquid polypropylene glycol.

7. In an improved method for preparing rigid polyurethane foams by reacting a polyol containing at least three active hydrogen atoms with a polyfunctional isocyanate in the presence of a gel catalyst, a blowing agent and a silicon-containing surfactant, the improvement comprising employing as the gel catalyst a composition consisting essentially of catalytically effective amounts of an antimony carboxylate, a potassium carboxylate and a zinc carboxylate wherein the hydrocarbyl portions of the carboxylates contain from 1 to 20 carbon atoms and wherein each of said antimony and potassium carboxylates constitutes from 10 to 40% by weight of said composition and the zinc carboxylate constitutes the remaining 20 to 80% by weight.

8. An improved method according to claim 7 wherein said antimony, potassium, and zinc carboxylates exhibit the general formulae $Sb(OOCR^1)_3$, $KOOCR^2$, and $Zn(OOCR^3)_2$, respectively, and wherein $R^1$, $R^2$ and $R^3$ are individually selected from the group consisting of hydrocarbyl containing from 1 to 20 carbon atoms.

9. An improved method according to claim 8 wherein $R^1$, $R^2$ and $R^3$ are alkyl.

10. An improved method according to claim 7 wherein $R^1$, $R^2$ and $R^3$ are

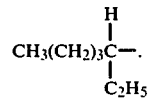

11. An improved method according to claim 7 wherein said composition contains a solvent for said antimony, potassium, and zinc carboxylates, said solvent being miscible with said polyol.

12. An improved method according to claim 11 wherein said solvent is a liquid polypropylene glycol.

13. An improved method according to claim 7 wherein said composition is present in a mixture with a catalytically effective amount of a conventional gel catalyst for rigid polyurethane foams.

14. An improved method according to claim 13 wherein said conventional gel catalyst is selected from the group consisting of tertiary amines, inorganic tin compounds and organotin compounds.

* * * * *